Oct. 6, 1964 G. K. HAUSE 3,151,622
GOVERNOR CONTROL SYSTEM FOR AUTOMATIC TRANSMISSIONS
Original Filed Nov. 8, 1958 5 Sheets-Sheet 1
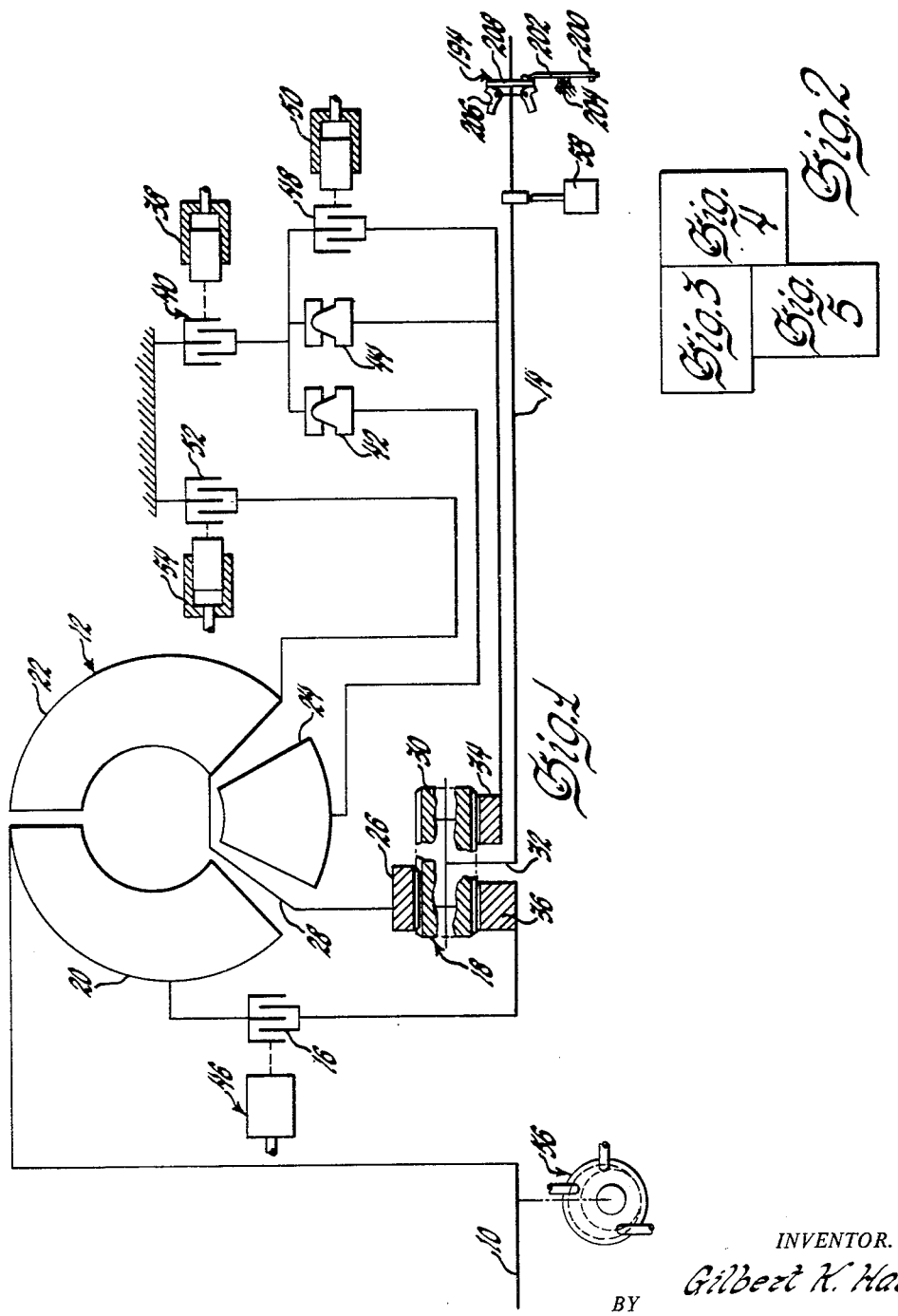
INVENTOR.
Gilbert K. Hause
BY
Hugh L. Fisher
ATTORNEY.

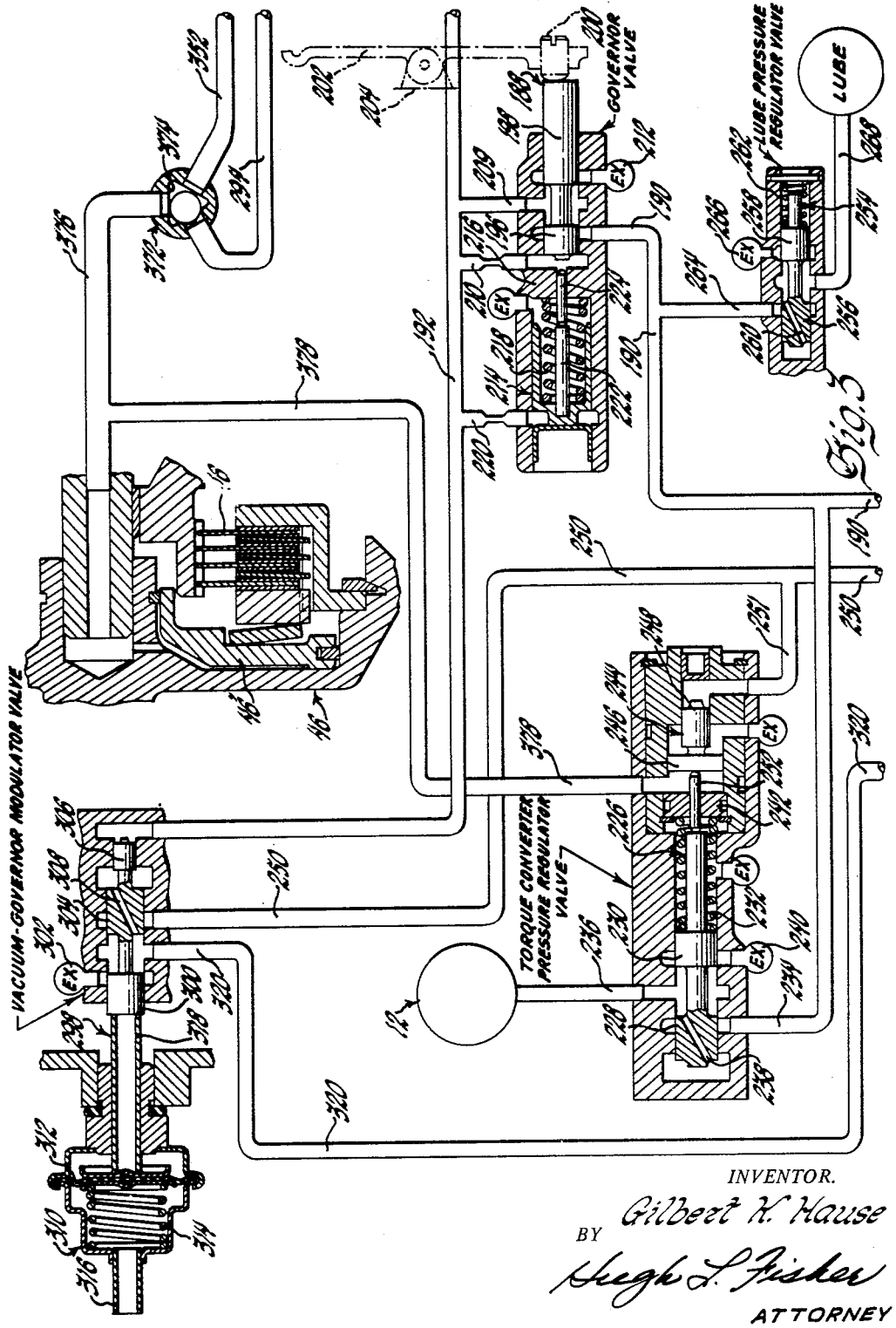

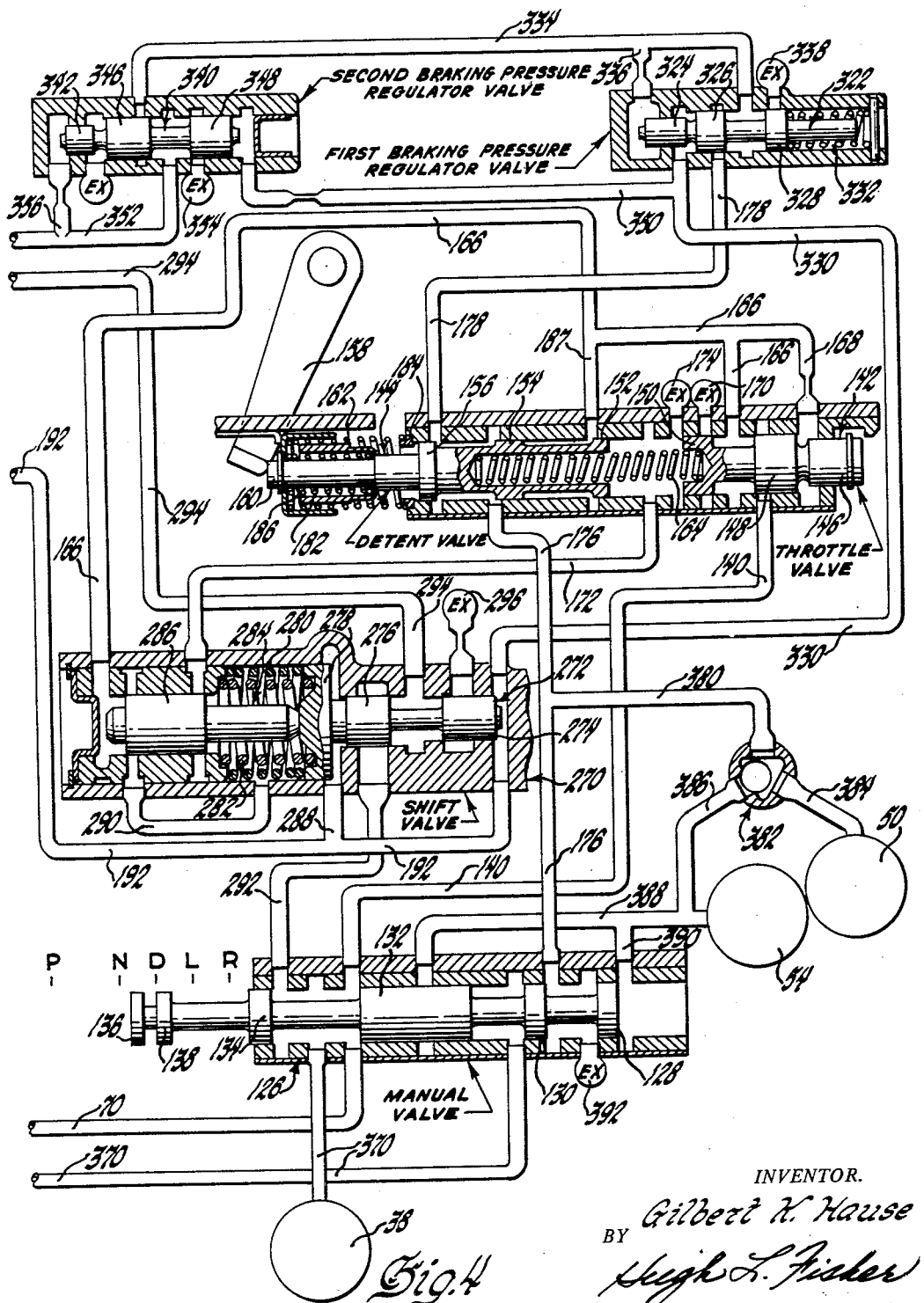

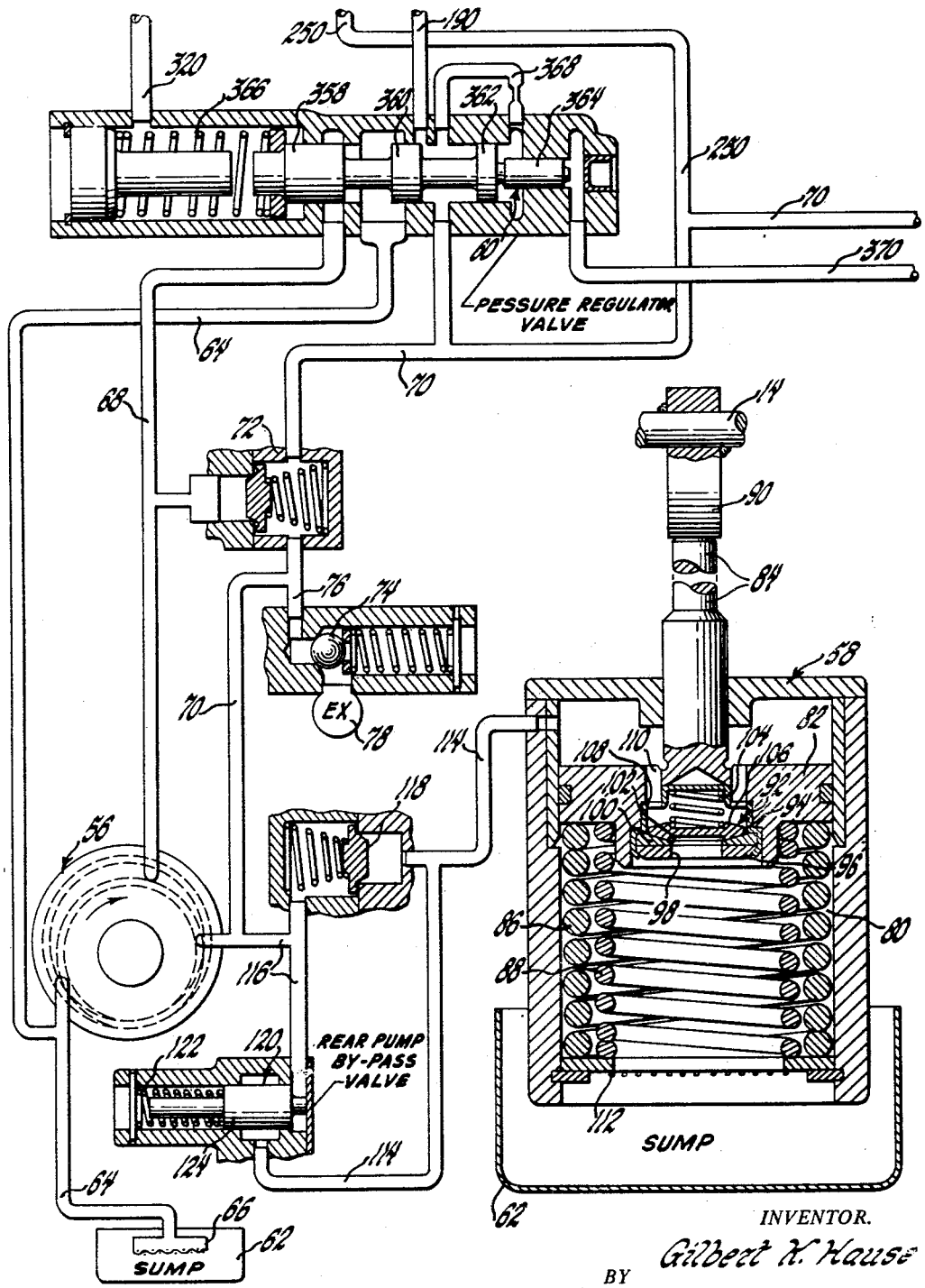

INVENTOR.
Gilbert K. Hause
BY
Hugh L. Fisher
ATTORNEY 3,151,622
GOVERNOR CONTROL SYSTEM FOR AUTOMATIC TRANSMISSIONS
Gilbert K. Hause, Bloomfield Township, Mich., assignor to General Motors Corporation, Detroit, Mich., a corporation of Delaware
Original application Nov. 8, 1958, Ser. No. 772,333, now Patent No. 3,108,493, dated Oct. 29, 1963. Divided and this application Aug. 26, 1960, Ser. No. 52,196
15 Claims. (Cl. 137—54)

This invention relates to improvements in control systems adapted for use, although not exclusively, with automatic transmissions.

This is a division of co-pending application Serial No. 772,333 to Gilbert K. Hause, filed November 8, 1958, now Patent No. 3,108,493, and entitled "Transmission."

Whenever shifts or ratio changes are incorporated in automatically operated transmissions, some form of governor is needed to initiate each change. Commonly, a hydraulic governor is utilized of the type comprising a rotating body with one or more valves therein operated by centrifugal effect to produce pressures reflective of rotational speed. Weights which shift due to centrifugal effect are made either integral with the valves or separate therefrom with provision for the transfer of their movements to the valve. Necessarily then, all of the rotating components, including the valves, weights, and the rotating body, must be considered when calibrating the governor. The valve sizes must be selected with both areas and weights in mind in order to produce pressures having a desired relation to the speeds. Also, with a rotary governor of this kind, vibration is a factor since different speed ranges produce different vibration problems. Further complicating the problem is the need often to develop governor pressures that vary during different stages of operation with unlike proportions to the speed, i.e., the governor pressures increase at different rates in different speed ranges.

Therefore, the invention seeks to provide a new type governor mechanism that employs non-rotating valving, that is simple structurally, and that may be easily made by accepted mass production techniques. Specifically, by the invention, non-rotating valving senses the speed of a rotatable member through an appropriate mechanism which transfers movement of a centrifugally operated weight revolvable with the rotatable member to the valving so as to develop a representative pressure. More specifically, according to the invention, the foregoing governor valving is arranged in a novel manner to produce pressures hydraulically in multiple stages in which the pressures vary with a different proportion to the speed.

Another aim of the invention is to provide novel valving for furnishing two different stages of pressure regulation.

The new governor employed by the transmission comprises a non-rotating valve mechanism for producing governor pressures that vary in different proportions to vehicle speed, thus providing two stages of regulation. Bias on the governor valve mechanism is created through linkage which transfers thereto weight swinging movements caused by the centrifugal effect produced from rotation of the transmission output. As vehicle speed increases, the increasing bias on the valve mechanism generates a governor pressure that increases at a certain rate in proportion to increasing vehicle speed until a selected value is attained, whereupon the generated governor pressure creates a counter-force opposing the bias from the weights. The counter-force then alters the rate of increase of governor pressure with respect to the vehicle speed so as to produce a second stage of regulation.

The foregoing and other objects and advantages of the invention will be apparent from the following description and from the accompanying drawings, in which:

FIGURE 1 is a diagrammatic illustration of a transmission;

FIGURE 2 demonstrates how the denoted figures may be combined to show the entire control system;

FIGURES 3, 4, and 5 each depicts sections of the transmission control system;

GENERAL DIAGRAMMATIC ARRANGEMENT

Figure 6:
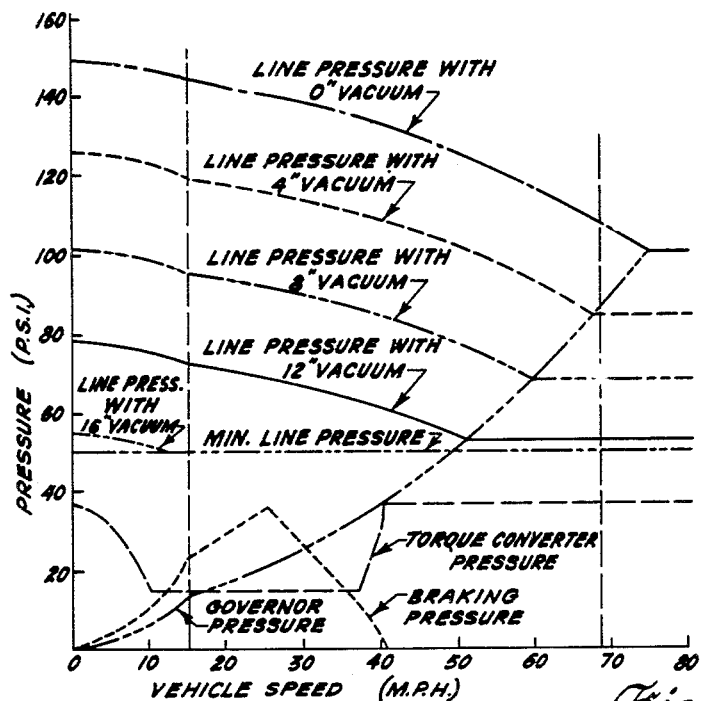
FIGURE 6 is a graph with several curves displayed thereon.

The transmission depicted in FIGURE 1 is similar in structure and function to that disclosed in the application Serial No. 721,455 to John Z. De Lorean, filed March 14, 1958, now Patent No. 2,968,197. Therefore, the description herein is somewhat brief since the transmission is only employed to demonstrate the principles of the invention, it being contemplated that other type transmissions could be used.

As shown, the numeral 10 designates a power shaft which transfers drive from an engine, not shown, to be a hydrodynamic torque transmitting device, such as torque converter 12. From the torque converter 12, drive is transferred to a load shaft 14, either partially through both a friction device 16 and the torque converter 12 to the planetary gearing 18 or entirely through the torque converter 12 to the gearing 18, in a way to become apparent.

The torque converter 12 operates in the usual way and includes an impeller 20 joined to the power shaft 10, a turbine 22, and a stator 24, together defining a fluid working circuit. Drive from the turbine 22 is transferred to an input ring gear 26 for the gearing 18 through a spider 28 specially constructed to offer a minimum resistance to flow through the working circuit between the impeller 20 and the stator 24. Ring gear 26 meshes with a series of elongated pinions 30 journaled on a carrier 32, in turn connected to the load shaft 14. On opposite sides of the carrier 32 and meshing with the elongated pinions 30 are a rear reaction sun gear 34 and a front sun gear 36.

Because of the connections needed, a single sun gear could not be used. But, by providing each of the sun gears 34 and 36 with the same number of teeth, the split sun gear arrangement produces the same result. This is because when they have identical tooth numbers and mesh with the same gears, one sun gear will always react the same as the other sun gear. For instance, if the reaction sun gear 34 is held, then the front sun gear 36 cannot revolve and if the reaction sun gear 34 is turned, the front sun gear 36 will likewise turn in the same direction and at the same speed.

Two ranges of forward drive operation, namely, a Low Range and a Drive Range are obtainable by engaging, through a fluid actuated servo motor 38, a forward brake 40. When engaged, the outer races for a pair of one-way devices 42 and 44, respectively, interposed between the stator 24 and the reaction sun gear 34, are held so that neither the stator 24 nor the reaction sun gear 34 can revolve backwardly. Each of the one-way devices 42 and 44 may be of known construction, such as the type employing sprags, rollers, or the like, to allow relative rotation between two members in one direction only.

Power in the Drive Range, with the forward brake 40 engaged, is transferred by the vehicle engine through shaft 10 and the torque converter 12 to the gearing 18.

With the torque converter turbine 22 revolving the input ring gear 26 forwardly, the reaction sun gear 34 will attempt to revolve backwardly which the one-way device 44 and the forward brake 40 will prevent. Therefore, the carrier 32, and accordingly the load shaft 14 will be revolved forwardly at a reduced speed, hereinafter referred to as a Low Speed Drive, which is determined by both the ratio of the torque converter 12 and the ratio of the gearing 18. At some selected speed of the impeller 20, the coupling point for the converter 12 will be attained and then the stator 24 will commence to revolve forwardly. The torque converter 12, thereafter, will function as a fluid coupling with drive therethrough being at nearly a 1 to 1 ratio except for fluid slippage. Consequently, the ratio will be determined, for all practical purposes, entirely by the gearing 18.

Preferably, at about the time the torque converter 12 commences operation as a fluid coupling, the friction device 16 is engaged by a fluid actuated servo motor 46 and functions as a clutch. It should be noted (see FIGURE 3) that the servo motor 46 has the piston 46′ exposed to converter charging pressure which will disengage the device 16 when the servo motor 46 is relieved of fluid pressure. A portion of the drive from the power shaft 10 is then transferred through the friction device 16 to the front sun gear 36 revolving it forwardly. (The front gear 36 may be revolved forwardly since the reaction sun gear 34 is allowed in Drive Range to revolve in this direction by the one-way device 44, thus the action conforms to the rule that both the sun gears 34 and 36 have the same direction and speed of rotation.) The other portion of the drive from the power shaft 10 is transferred by the fluid from the impeller 20 to the turbine 22 and then to the input ring gear 26. Since the sun gear 36 and the ring gear 26 are now driven at approximately the same speed, except for converter slippage, the gearing 18 becomes locked up for substantially unitary drive and the load shaft 14 will be driven at nearly the same speed as the power shaft 10. With the friction device 16 functioning as a clutch, the resultant split torque or high speed drive minimizes the effect of the converter fluid losses and offers a more efficient drive between the power shaft 10 and the load shaft 14, particularly desirable for economy reasons.

Drive in Low Range is the same as when proceeding in the low speed ratio in Drive Range except that a low and reverse clutch 48 is engaged by a fluid actuated servo motor 50. The low and reverse clutch 48 interconnects the reaction sun gear 34 and the forward brake 40, bypassing the one-way device 44 so that the sun gear 34 is restrained from rotation in either direction. Consequently, engine braking is available in Low Range whenever the load shaft 14 drives, as during coast. With the load shaft 14 driving, the reaction sun gear 34 tends to revolve forwardly, and if allowed, the gearing 18 would be ineffective to drive in this direction. Since the reaction sun gear 34 cannot revolve forwardly, the ring gear 26 is overdriven as is the converter turbine 22. The turbine 22, in turn, attempts also to overspeed the impeller 20 which the engine resists. As a result, the turbine 22 and the impeller 20, in effect, provide a churn brake with the turbine 22 being slowed through the fluid medium by the engine braking resistance on the impeller 20.

In addition, in Low Range, whenever the engine throttle is closed, the friction device 16 is engaged a varied amount to supplement further the engine braking available. To explain this aspect of operation, as has been mentioned, when the rear sun gear 34 is held, the front sun gear 36 is likewise held, and hence, the varied engagement of the friction device 16 causes the friction device 16 to act now as a slippable brake and retard the engine. Stated in another way, the friction device 16 in performing as a brake resists rotation of the impeller 20 and accordingly the engine by the turbine 22. This is significant since, inherently, a torque converter, when designed for efficient forward drive, is generally inefficient when drive is reversed, as during coast. Therefore, the supplemental braking from the friction device 16 which functions both as a brake and a clutch during different phases of operation is very desirable.

Reverse Drive is obtained by engaging a reverse brake 52 through a fluid actuated servo motor 54. Engagement of the reverse brake 52 prevents rotation of the converter turbine 22 and thus the input ring gear 26. The friction device 16 and forward brake 40 are both disengaged while the low and reverse clutch 48 is engaged. Consequently, with the power shaft 10 revolving forwardly, the stator 24 will be driven backwards. This reverse rotation will be transferred through one-way device 42 and the low and reverse clutch 48 to the reaction sun gear 34, whereupon the carrier 32 and load shaft 14 will be driven backwardly at a reduced speed.

CONTROL SYSTEM

The various fluid actuated servo motors for the FIGURE 1 transmission are operated by a control system which is normally supplied pressure fluid by a front pump 56, preferably driven at the speed of the power shaft 10. When vehicle push-starting is needed, then a rear pump 58, driven at the speed of the load shaft 14 becomes effective, as will be explained. The pressure of the fluid delivered by the front and rear pumps 56 and 58 to the system is determined by a pressure regulating valve, designated generally at 60. Inasmuch as the relationship and operation of the pumps 56 and 58 and the pressure regulating valve 60 are the subject of two Hause Applications, S.N. 765,416, now Patent No. 3,006,148, and S.N. 765,542, now Patent No. 3,067,689, both filed October 6, 1958, the description thereof will be devoted to explaining their adaptation for use in the illustrated embodiment of the control system.

With reference to FIGURE 5, the front pump 56 may be of the vane or gear type so constructed as to withdraw fluid from a sump 62 through a suction line 64 in which a screen 66, or equivalent, is installed for filtering the incoming fluid. When the front pump 56 is operative, pressure fluid is first discharged into a secondary line 68 and subsequently into a main line 70, both of which lines extend to the pressure regulating valve 60. Pressure fluid in the secondary line 68 may also be delivered, when of a predetermined value greater than the fluid pressure in the main supply line 70, particularly during initial operation of the front pump 56, to the main supply line 70 through a line check valve 72. This makes readily available the large volume of fluid needed to commence operating the transmission.

To insure that the pressure in the main supply line 70 does not become so excessive as to cause damage to the transmission, a safety relief valve 74 is installed in a branch 76 of the main supply line 70 and set so as to open the main supply line 70 to an exhaust port 78 therein whenever pressure in the main supply line 70 exceeds some selected value.

The rear pump 58, as depicted, is of the piston kind and comprises a chamber 80 in which a pump piston 82 is slidably positioned. A piston rod 84 is made integral with or appropriately attached to the piston 82 and is biased by a pair of springs 86 and 88 into engagement with the periphery of a cam 90 secured to the load shaft 14. Mounted within the piston 82 is a rear pump check valve 92, preferably installed as the unitary assembly depicted. The check valve 92 has a housing 94 in which an annular member 96 with a center opening 98 is positioned. A valve seat 100 is formed on the annular member 96 and has an opening 102 therein aligned with the opening 98 in the annular member 96. Seated on the valve seat 100 and biased into engagement therewith by a spring 104 is a valve element 106. The housing 94 is provided with a series of openings 108 which are aligned with corresponding passages 110 in the piston 82.

When the cam 90 is revolved by the load shaft 14, the piston rod 84 will reciprocate the piston 82 so that on the upstroke the check valve 92 will close and fluid will be drawn from the sump 62 through a screen 112 into the space with the springs 86 and 88. Then when the piston 82 is moved downwardly, the valve element 106 of the check valve 92 will open and the fluid under pressure will be transferred through the openings 108 in the housing 94 and the passages 110 in the piston to a rear pump discharge line 114. The rear pump 58 will continue to operate as long as the piston rod 84 is maintained in engagement with the cam 90.

Communication between the rear pump discharge line 114 and a branch 116 from the main supply line 70 is controlled both by a front and rear pump check valve 118 and a rear pump by-pass valve 120. The check valve 118 will only open when the pressure of the fluid in the rear pump discharge line 114 is some chosen amount greater than the pressure from the front pump 56 in the branch 116, and hence, functions to correlate the outputs from both the front and rear pumps 56 and 58. The rear pump by-pass valve 120 is slidable in a bore in the control system valve body and is biased by a spring 122 to the viewed position so that a land 124 thereon interrupts communication between branch 116 and a port connected to the rear pump discharge line 114. When the front pump pressure in branch 116 attains a predetermined amount, e.g., 28 p.s.i., the rear pump by-pass valve 120 will open and the fluid from the front pump 56 at this pressure will be delivered via rear pump discharge line 114 to the top face of the rear pump piston 82 and force the piston 82 downwardly to an inoperative position in which the piston rod 84 is held out of engagement with the cam 90.

From the foregoing, it can be seen that when the front pump 56 is inoperative, as when the engine is not running and the vehicle is being pushed, the rear pump 58 will be operative and supply pressure fluid through the front and rear pump check valve 118 to the main supply line 70 until this pressure is adequate to open the rear pump by-pass valve 120, whereupon the rear pump 58 will stop pumping until the pressure drops below that at which valve 120 opens. Of course, this pressure at which the rear pump 58 cuts out is intended to be adequate to operate the transmission so as to revolve the engine and start the front pump 56 operating.

In summary, with this pump arrangement, the rear pump 58 is only utilized for push-starting and develops a pressure adequate to cause the engine to be revolved for starting. When the front pump 56 develops the minimum pressure 28 p.s.i., the rear pump 58 becomes wholly inoperative so that no power is consumed to operate the rear pump 58 even at low speeds, and of course, there is no wear. In other words, the rear pump 58 is not allowed to continue operation even though against a reduced pressure head which still would require some power.

*Manual Valve*

The main supply line 70 extends to a port in a valve body bore in which is slidably positioned a manual valve, indicated generally at 126. The manual valve 126 is formed with lands 128, 130, 132, and 134 and spaced flanges 136 and 138 at the external end thereof. The flanges 136 and 138 receive a fork, or other appropriate agency, by which the manual valve 126 can be moved to any of a number of positions denoted by lines with appropriate legends, e.g., Park, Neutral, Drive Range, Low Range, and Reverse. The operating lever for moving the manual valve 126 to these denoted positions may be of the usual kind customarily located for easy access by the driver. The other ports communicating with the bore of the manual valve 126 will be described as the explanation proceeds.

*Throttle and Detent Valves*

The manual valve port connected to the main supply line 70 also communicates with a throttle valve supply line 140 extending to a port in another valve body bore in which are slidably positioned axially spaced throttle and detent valves 142 and 144. The throttle valve 142 is furnished with spaced lands 146, 148, and 150 and the detent valve 144 with separated lands 152, 154, and 156. A cam lever 158, which is constructed and arranged to have movement proportional to that of the throttle and the accelerator pedal (not shown), engages a stem portion 160 of the detent valve 144 and when the throttle is open will urge the detent valve 144 further into the bore in opposition to the bias from a spring 162. The resultant force from the opening movements is transferred by a spring 164, interposed between the detent valve 144 and the throttle valve 142, to the throttle valve 142.

The throttle valve 142 operates as a regulating valve, in a known manner, to develop a throttle valve pressure in the supply line 166 which is proportional to throttle position. When the throttle commences to open, then, as just explained, this force is sensed by the throttle valve 142 which will cause land 148 to open a port connected to the throttle valve supply line 140 and allow pressure fluid to be transferred to the throttle pressure supply line 166. The fluid pressure in line 166 is then delivered through a restricted branch 168 thereof to the end differential area determined by the lands 146 and 148, whereupon the throttle valve 142 will be urged to the left so that the land 148 closes the port connected to the supply line 140 and the land 150 opens exhaust port 170. As a consequence, the pressure in the line 166 will drop and the valve 142 will shift back until the land 148 again opens the port connected to the line 140. This cycle will continue thereby regulating the pressure furnished to the line 166 which pressure will increase as the throttle is opened until some predetermined maximum throttle pressure is developed which may be equivalent to main line pressure, if desired.

With the detent valve 144 in the illustrated closed throttle position, a port in the bore connected to a detent pressure supply line 172 is allowed to communicate with exhaust port 174 and drain or exhaust line 172. Also, in this same position of the detent valve 144, lands 154 and 156 will align the ports connected to a braking pressure feed line 176 and a braking valve supply line 178. As the accelerator pedal is depressed and when approaching the full throttle position, a cup-shaped spring retainer sleeve 182 slidably situated on the stem portion 160 will abut the edges of a ring 184 surrounding the bore, whereupon the bias from a spring 186 will become effective. The vehicle operator will sense this additional bias which will advise him that he is approaching the detent downshift position of the detent valve 144. Further depression of the accelerator pedal will cause the detent valve lands 152 and 154 to align the ports connected to a branch 187 of the throttle pressure supply line 166 and the detent pressure supply line 172.

The relationship of the throttle and detent valves 142 and 144 to the control system and their functions relative to the transmission will be explained further in the detailed operational summary.

*Governor Valve*

A governor valve, designated generally at 188, reciprocates in another valve body bore that is provided with a port which communicates with a governor and torque converter feed line 190 extending from the pressure regulator valve 60. The governor valve 188 develops a pressure in a governor pressure supply line 192 proportional to the speed of the load shaft 14, being operated by a centrifugal weight type governor shown at 194, and accordingly to the speed of the vehicle.

The governor valve 188 is formed with a narrow land 196 and a wide land 198 with the end of the latter land 198 being in engagement with an adjusting screw 200 threadedly attached to the end of a transfer lever 202. The adjusting screw 200 allows calibration of the governor pressures in relation to the load shaft speed. Transfer lever 202 is pivoted at 204 so that when a set of governor weights 206 suitably connected to the load shaft 14 swing outwardly with an increase in speed, a bearing 208 will be shifted axially on the load shaft 14, thereby abutting the upper end of the transfer lever 202. As a result, the governor valve 188 will be moved in an increasing governor pressure direction with land 196 opening the port connected to the feed line 190. Fluid pressure then is transferred through the port connected to a branch 209 of the governor pressure supply line 192, through branch 209, supply line 192, and thence via a restricted control branch 210 to the end area of the land 196. Resultant opposing forces will, if great enough, move the governor valve 188 in a decreasing pressure direction and the land 198 will open an exhaust port 212 affording a momentary relief of pressure. These movements of the valve 188 between inlet and exhaust ports are those of a conventional pressure regulating valve and will continue so as to generate a governor pressure reflective of load shaft speed at a relatively fast rate, this fast rate being needed for slow speeds. Otherwise, if the rate of increasing governor pressure was too low, the governor pressure developed at slow vehicle speeds would not be adequate to operate the various control valves.

At a certain relatively low vehicle speed, for instance 15 m.p.h., the rate of increase in governor pressure is not as critical, and hence, it is desirable for the governor pressure to increase at a slower rate. This is accomplished hydraulically through a governor valve element 214 which is slidable in an opposite axially aligned bore separated from the governor valve bore by a wall 216. The governor valve element 214 is urged to the depicted inoperative position by a spring 218 in opposition to governor pressure transferred to the face area thereof by a restricted branch 220 of the governor pressure supply line 192. An internal stem 222 is furnished the governor valve element 214 which stem 222 is arranged to engage a control pin 224 extending through an aperture in the separating wall 216. The control pin 224 is of a relatively small diameter and is subjected to the pressure in the restricted control branch 210. Thus, the control pin 224 will be in continuous engagement with the end of the valve element stem 222. At some predetermined governor pressure adequate to overcome the bias from spring 218, the governor valve element 214 will be shifted far enough so that the control pin 224 engages the end of the governor valve 188. The resultant force supplied by the valve element 214 opposes that from the governor 194 and thereby reduces the rate of increase in governor pressure.

Reference is made to the graph in FIGURE 6 to better understand the two-stage governor pressure operation. As denoted in the graph, the curve labeled governor pressure climbs rather rapidly until approximately 15 m.p.h. is attained. Then the rise in governor pressure is slower since the valve element 214 will have become effective.

*Torque Converter Pressure Regulator Valve*

Positioned in the diagram near and above the pressure regulator valve 60 is a torque converter pressure regulator valve, which is designated generally at 226. The converter pressure regulator valve 226 is constructed to reciprocate in a bore in the valve body and is formed with two spaced lands 228 and 230. A spring 232 biases the valve 226 so that land 228 will open a port connected to a branch 234 of the governor and torque converter feed line 190. Fluid pressure then proceeds both to the torque converter 12 through a converter inlet line 236 and to the face area of the land 228 via a transverse passage 238. This pressure acting on the face of the land 228 will oppose spring 232 and if sufficient will shift the valve 226 until land 230 opens an exhaust port 240. This cycle is repeated as the valve 226 regulates the pressure in the converter inlet line 236 in the usual way.

In an extension of the bore for the valve 226 and separated therefrom by a fixed plug 242 is a converter valve element 244 afforded with large diameter land 246 and a small diameter land 248. A branch 250 of the main supply line 70 supplies main line pressure through a sub branch 251 to the face of the small diameter land 248 with the resultant force being transferred by a control pin 252, slidable in the plug 242, to the converter pressure regulating valve 226 so as to combine with the spring 232 in urging the valve 226 in a pressure increasing direction. Consequently, variations in line pressure will influence the pressure delivered to the torque converter 12. When the friction device 16 is engaged, as will be explained in the operational summary, the influence of line pressure in branch 250 is eliminated.

*Lube Pressure Regulator Valve*

Viewed in the diagram below governor valve 188 is a lube pressure regulator valve 254 having spaced lands 256 and 258 and being slidable in a bore in the valve body. The land 256 has therein a transverse passage 260 so that when a spring 262 urges the valve 254 far enough to open the port connected to a branch 264 of the governor and torque converter fed line 190, fluid pressure will be transferred by the transverse passage 260 to the end area of land 256 and oppose the spring 262 and tend to return the valve 254 to a position in which the land 258 opens an exhaust port 266. This regulating action has been explained before and will produce a fluid pressure in the lube supply line 268 to the various lubrication channels for the transmission of some predetermined value adequate for the purposes intended and without unduly burdening the system.

*Shift Valve*

Near the manual valve 126 in the diagram, and generally shown at 270, is a shift valve train which includes a shift valve 272 movable in a bore in the valve body. The shift valve 272 has small diameter lands 274 and 276, land 276 being somewhat larger, and a larger diameter land 278 and is urged to the downshifted position, viewed, by a pair of springs 280 and 282. The train is completed by a plug valve 284 formed with a single land 286 and is engageable with the large diameter end of the shift valve 272.

Governor pressure in the governor pressure supply line 192 acts both on the end area of the shift valve land 274 and through a branch 288 of the supply line 192 on the area of the shift valve 272 defined by lands 276 and 278, and therefore, urges the shift valve 272 towards the upshifted position. Opposing this governor pressure is throttle pressure furnished by the throttle pressure supply line 166 to the end area of plug valve 284.

Initially, with the plug valve 284 and shift valve 272 removed to the downshifted position, throttle pressure can proceed past the plug valve land 286 through a passage 290 to the spring pocket and act on the full face area of the shift valve land 278. As governor pressure increases and moves the shift valve 272 towards the upshifted position, the plug valve 284 will cut off communication between passage 290 and the throttle pressure supply line 166 and exhaust the spring pocket through the detent pressure supply line 172. The sudden relief of pressure in this manner will produce a snap action and the shift valve 272 will quickly proceed to the upshifted position in which lands 274 and 276 will align ports connected, respectively, to a shift valve inlet line 292 extending to the manual valve 126 and a shift valve outlet line 294. For downshifting movement of the shift valve 272, the reverse sequence takes place with governor pressure decreasing until throttle pressure dominates and this causes plug valve 286 to move far enough to admit throttle pressure again into passage 209 and cut off the exhaust through the detent pressure supply line 172, whereupon the sudden addition of the pressure to the spring pocket will generate a downshift snap action and return the shift valve 272 to the illustrated position. An exhaust port 296, when the shift valve 272 is fully removed to the downshifted position, will drain line 294.

The relationship of the shift valve 270 to the control system and transmission will be detailed more fully in the operational summary.

*Vacuum-Governor Modulator Valve*

In another bore in the valve body, a vacuum-governor modulator valve, viewed at 298, is movably disposed therein and functions to develop a modulated pressure reflective of governor pressure and engine vacuum which is supplied to the pressure regulator valve 60. As demonstrated, the modulator valve 298 has a land 300 which controls the opening of an exhaust port 302, a land 304 for controlling the port connected to the branch 250 of the main supply line 70, and a land 306 whose face area is exposed to governor pressure in the governor pressure supply line 192. A transverse passage 308 in the land 304 allows pressure fluid to proceed to the valve area defined by the difference between lands 304 and 306 enabling the modulator valve 298 to regulate pressure in the conventional fashion. On the opposite side of the valve 298 and near land 300 is a housing 310 which encloses a flexible diaphram 312 biased to the demonstrated position by a spring 314. The spring side of the flexible diaphragm 312 is exposed through a conduit 316 to the vacuum in the intake manifold of the engine which vacuum draws the flexible diaphragm 312 to the left and carries therewith a tubular connector 318 interconnecting the diaphragm 312 and modulator valve 298.

With this construction and assuming the vacuum produced by the intake manifold is maximum or closely approximates maximum with a value, e.g., of 16″ of mercury, such as would be occurring at engine idle, the diaphragm 312 will be drawn to the left form the viewed position and will urge modulator valve 298 in a pressure decreasing direction, as will increasing governor pressure. With an increasing load on the engine, vacuum decreases and the spring 314 will tend to urge the modulator valve 298 in a pressure increasing direction in opposition to governor pressure which may be increasing or decreasing and develop a corresponding modulated pressure. This modulated pressure is then transferred through modulated pressure delivery line 320 to the pressure regulator valve 60 for purposes to be defined more clearly in the explanation of the transmission control system operation.

*First Braking Pressure Regulator Valve*

A first braking pressure regulator valve, denoted at 322, is slidably housed within a bore in the valve body upstream of the throttle valve 142 and in the braking valves supply line 178. Regulator valve 322 has spaced apart thereon a small diameter land 324 and equal diameter lands 326 and 328. Governor pressure provided by a branch 330 of the governor pressure supply line 192 acts on the differential area between the lands 324 and 326 of the regulator valve 322 and urges it in a pressure decreasing direction against the opposing bias from a spring 332.

At the commencement of operation, the spring 332 will dominate when there is little or no governor pressure and the port connected to line 178 will be fully opened to a port joined to an outlet line 334 from the valve 322. The pressure in the line 334 then will, through a restricted branch 336 thereof, act on the end area of land 324 urging valve 322 to the right so as to open exhaust port 338. However, the valve areas are such that the spring 332 will continue to maintain the valve 322 open until governor pressure builds up to a certain value, for instance, to a pressure equivalent to 25 m.p.h. Then, regulation in a conventional maner will take place with the pressure developed gradually reducing as governor pressure increases further until finally at some predetermined vehicle speed governor pressure will be great enough to cause the valve 322 to close the port connected to line 178 and intrrupt the supply of regulated fluid pressure to outlet line 334.

*Second Braking Pressure Regulator Valve*

Upstream of the first braking pressure regulator valve 322 and movable in another bore of the valve body is a second braking pressure regulator valve 340. This valve 340 also has a small diameter land 342 and two equal diameter lands 346 and 348 spaced apart, as shown. A restricted sub-branch 350 of the branch 330 of the governor pressure supply line 192 transfers governor pressure to the end area defined by the land 348 on valve 340 and urges the valve 340 in a pressure increasing direction so as to interrupt communication between a braking pressure delivery line 352 and an exhaust port 354 and establish communication with the first braking pressure regulator valve outlet line 334. When this happens, pressure in line 352 proceeds via a restricted branch 356 thereof to the end area defined by land 342 and opposes governor pressure. The valve 340 then regulates to produce in the line 352 a braking pressure which increases with an increasing governor pressure until the governor pressure attains some chosen value, the pressure at 25 m.p.h. being exemplary, whereupon the ports connected to the lines 334 and 352 will be fully open to each other and regulation halted. As a result, the braking pressure developed by valve 340 will increase as governor pressure increases up to a predetermined maximum at 25 m.p.h.

OPERATION

The operation of the control system in conjunction with the various components of the transmission, previously described, will be apparent from the following described phases of operation, designated by the appropriate headings.

*Park and Neutral*

It is contemplated that when the manual valve 126 is in either the Park or Neutral settings that the vehicle engine may be started. When the manual valve 126 is in the Park setting a suitable mechanism (not shown) is adapted to hold the load shaft 14 against rotation and thereby afford a parking brake. With the manual valve 126 in either of these positions and with the engine started, the pump 56 will commence operation, as has been explained, supply pressure fluid to the pressure regulator valve 60 which will start to regulate the pressure of the fluid in the main supply line 70.

The pressure regulator valve 60, which is seen in FIGURE 5 of the diagram just above the pump 56, is mounted in a valve body bore and has thereon in spaced relation three equal diameter lands 358, 360, and 362, and a smaller diameter land 364. A spring 366 combines with modulated pressure delivered from the vacuum and governor modulator valve 298 by delivery line 320 to urge the pressure regulator valve 60 in a pressure increasing direction. Since the vehicle is stationary, there is no governor pressure and assuming the engine is idling, the resultant modulated pressure will be relatively low. Opposing the modulated pressure and the spring 366 is the fluid pressure delivered by a restricted branch 368 of line 70 to the differential area on the valve 60 determined by lands 362 and 364.

When the pressure on the differential area dominates, the presure regulator valve 60 will proceed leftwardly until, during a first step in the regulation, the land 360 opens a port connected to the governor and torque converter feed line 190. During this step of the regulation, the port connected to the line 190 will function somewhat as an exhaust and the valve 60 will alternately open and close this port until the torque converter 12 is filled and the pressure therein has been stablized by the action of the converter pressure regulator valve 226. The pressure in the main supply line 70 is supplied by the branch 250 threof and sub-branch 251 to the converter valve element 244 and will cause the converter pressure, as has been explained, to increase or decrease therewith. Also, the lube pressure regulator valve 254 will become operative to commence supplying the transmission lubrication channels and the governor valve 188 will remain in the depicted inoperative position until vehicle movement has commenced.

During the next step in the regulation, occurring when the pressure in the line 190 becomes substantially the same as that in the line 170, the pressure regulator valve 60 will move further to the left until land 358 opens the front pump secondary supply line 68 to the front pump suction line 64. The relief of line 68 removes some of the load on the pump 56 since the secondary line 68 when opened to the suction line 64 removes the pressure head which the pump 56 was required to overcome.

The final step of regulation arises when the regulator valve 60 moves slightly further so that the land 360 commences to relieve excess pressure in the main supply line 70 out the suction line 64. Main line pressure now will stablilize with the valve 60 regulating and using suction line 64 as an exhaust until one of the pressure influencing mediums is changed, such as the engine vacuum.

Upon commencement of operation by the front pump 56, the secondary line 68 is supplied a greater pressure than line 70. Consequently, the check valve 72 will open and the fluid pressure in line 68 will supplement that in the main supply line 70 so that the system pressure is built up more quickly. However, as soon as the pressure within the main supply line 70 becomes great enough to close the check valve 72, it will shut and ultimately, the pressure regulator valve, as explained, will exhaust the secondary line 68. Also, as has been mentioned, when the pressure in the main supply line 70 is sufficient and builds up to the exemplary 28 p.s.i., the rear pump by-pass valve 120 will open and the rear pump 58 will be held in an inoperative position. Further progress of pressure fluid in the main supply line 70 to the system in Park and Neutral is blocked by the manual valve land 132.

When the operator decides to propel the vehicle forwardly the manual valve 126 may be placed in either the Drive Range or Low Range settings, the sequence to be pursued in the following description.

*Drive Range*

To establish the Drive Range of operation, the manual valve 126 is placed in the corresponding setting with the result that fluid pressure is supplied by the main supply line 70 to the throttle valve supply line 140 extending to the throttle valve 142, to the shift valve inlet line 292, and to a supply line 370 for the forward brake servo 38. Therefore, the throttle valve 142 will commence to develop a throttle pressure corresponding to the throttle setting. The fluid pressure in the inlet line 292 to the shift valve 272 will be stopped from further progress beyond the land 276 at this time and the forward brake servo motor 38 will engage the forward brake 40. The forward brake 40, as mentioned, holds the gearing reaction sun gear 34 and the torque converter stator 24 against reverse rotation, thereby rendering the gearing 18 effective to produce a reduced drive and enabling the torque converter 12 to multiply torque. An extension of line 370 extends to the pressure regulator valve 60 and acts on the end area of the land 364 creating a reduction in line pressure, this reduced pressure being adequate for operation in Drive Range.

Opening of the throttle by depressing the accelerator pedal, now, will cause the vehicle to proceed forwardly and the governor 188 will develop a governor pressure at the initial fast rate. This govenror 188 will start to decrease the line pressure through the development of the corresponding modulated pressure in delivery line 320, which can be seen in FIGURE 6 graph, wherein the curves denoted "line pressure" with the indicated degrees of vacuum, represent the changes in line pressure at the specified vacuum as vehicle speed increases. As illustrated, the line pressure decreases gradually until vehicle speed is approximately 15 m.p.h. Then, as has been discussed in the description of the governor valve 188, the valve element 218 becomes effective to cause the governor valve 188 to produce governor pressure at a slower rate, and this is shown on the graph, wherein the line pressure now decreases at a corresponding lesser rate.

When, within a selected range of vehicle speeds, e.g., between 20 and 65 m.p.h., the proportion between throttle position and vehicle speed produces corresponding throttle and governor pressures in proportions that will cause the shift valve 272 to upshift, fluid pressure will be transferred through the shift valve outlet line 294 to a ball type shuttle valve, indicated at 372, housed within a chamber 374. As viewed, in addition to the line 294 opening into the chamber 374, also the braking pressure delivery line 352, and the delivery line 356 for the friction device 16 open therein. Because of the construction, the shuttle valve 372 will always close the line which is connected to an exhaust, and therefore, since line 352 is open to exhaust port 354 in the bore of the second braking pressure regulator valve 340, the valve 372 will close line 352 and fluid pressure can proceed from line 294 to a delivery line 376 for the friction device 16. The servo motor 46 for the friction device 16 will be actuated against the pressure opposition from the converter charging pressure and the friction device 16 will engage. Drive will be, then, in the high speed drive. With this drive ratio effective, as mentioned, a split torque drive results, i.e., a portion of the drive proceeds directly to the gearing 18 and another portion through the torque converter 12 to the gearing 18.

When the high speed drive ratio is effective and the friction device 16 engaged, the pressure within the torque converter 12 is reduced now that the torque converter 12 is only transmitting a portion of engine torque. This reduction is accomplished by transferring the same fluid pressure which engages the friction device 16 through an extension 378 of the friction device delivery line 376 to the front face of the converter valve element 244. The pressure acting on this front face, because of the larger area, will overcome the pressure in sub-branch 251 acting on the smaller area and shift the converter valve element 244 rearwardly so as to eliminate the influence on the converter pressure regulator valve 226. The pressure regulator valve 226 will now regulate at a much lower pressure determined by spring 232 and the slight force from control pin 252, thereby reducing the charging pressure within the torque converter 12.

There are four different ways to obtain a downshift from high speed drive to low speed drive when in Drive Range. These are made either as a detent downshift, a forced downshift, a manual downshift, or a closed throttle downshift, each being described below.

The detent downshift from high to low speed drive can be produced below some selected speed, e.g., 63 m.p.h., by depressing the accelerator pedal the full extent permitted. In depressing the accelerator pedal, a point will be reached slightly before being fully depressed where the detent spring 186 is felt which, preferably, coincides with a full opening of the throttle. The operator knows, then, that if a downshift has not already occurred, further depression of the accelerator pedal will induce the downshift. As has been explained, when the detent valve 144 is in the detent or downshifted position, throttle pressure in the branch 187 of the throttle pressure supply line 166 is transferred between the lands 152 and 154 to the detent pressure supply line 172. Also, the resultant force from the detent movement of the valve 144 will cause the throttle valve 142 to fully open the port connected to the throttle valve supply line 140, whereupon throttle pressure and likewise detent pressure will become the same as the line pressure. Since the shift valve 272 and the plug valve 284 are in the upshifted position, detent pressure can move into the spring chamber and act on the face area of the shift valve large diameter land 278. At speeds below 63 m.p.h. the force from this pressure along with that contributed by pressure acting on plug valve 284 are adequate to overcome the opposing force from governor pressure and the shift valve 272 will be mover to the downshifted position in which communication between the shift valve inlet and outlet lines 252 and 294 is interrupted and the port to the outlet line 294 is connected to exhaust port 296. The pressure fluid in the friction device servo motor 46 will be drained out the exhaust port 296, and the converter charging pressure will disengage the friction device 16. As a result, the transmission will downshift to low speed drive with all the drive from the torque converter 12 proceeding through the gearing 18.

If the vehicle operator depresses the accelerator pedal to the point where the detent spring 186 is effective or short of this point when proceeding forwardly in high speed drive at speeds somewhat less than 63 m.p.h. and the throttle pressure developed thereby if in acting on the plug valve 284 produces a force greater than that from governor pressure at this vehicle speed, a force downshift will occur with the shift valve 272 moving to the downshifted position. This will, as just discussed, cause the friction device 16 to disengage.

Up to approximately 65 m.p.h., by way of example, a manual downshift can be made by moving the manual valve 126 from the Drive Range setting to the Low Range setting. In doing this, the manual valve land 134 interrupts the transfer of fluid pressure from the main supply line 70 to the shift valve inlet 292 and drains this line through the open end of the manual valve bore. Since the fluid pressure supplied to the friction device servo motor 46 is cut off, the friction device 16 will be disengaged and the vehicle, as before, will proceed in low speed.

A closed throttle downshift from high to low speed drive will occur automatically below 10 m.p.h., for instance, at which time governor pressure is no longer adequate to maintain the shift valve 272 in the upshifted position. Consequently, the shift valve 272 will move to the downshifted position and, as explained before, the friction device servo motor 46 will be drained through the exhaust port 296 in the bore of the shift valve. With a closed throttle, no throttle pressure is developed; however, the springs 280 and 282 acting on the shift valve 272 are adequate to force the shift valve 272 to the downshifted position.

There are two Low Ranges of operation discussed below, one with the engine driving and the throttle removed from the closed position, the other with the vehicle coasting and the throttle closed.

*Low Range (Driving)*

With the manual valve 126 in the Low Range setting, as has been mentioned, the land 134 will be so aligned that the shift valve inlet supply line 292 will be opened to exhaust through the bore of the manual valve 126. Thus, the shift valve 272 is rendered ineffective to produce an upshift. The forward brake servo motor supply line 370 is still supplied pressure fluid and this pressure fluid is, additionally, transferred between lands 130 and 132 on the manual valve 126 to the braking pressure feed line 176. Since the detent valve 144 is removed from the closed throttle position, passage of pressure fluid beyond the detent valve 144 is prevented by the land 156 thereon. But, the pressure fluid in the line 176 proceeds through a branch 380 thereof to a shuttle valve 382, similar to previously described shuttle valve 372. Shuttle valve 382 has an opening therein, in addition to the branch 380, a supply line 384 to the low and reverse clutch servo motor 50, and a branch 386 of a supply line 388 for the reverse brake servo motor 54. As with shuttle valve 372, the shuttle valve 382 will close the line opening therein which is exhausted. In this arrangement in Low Range, the reverse brake servo motor supply line 388 is relieved through a branch 390 thereof between manual valve lands 128 and 130 to an exhaust port 392 in the bore of the manual valve 126. Therefore, pressure fluid is supplied through the shuttle valve 382 and the low and reverse clutch 48 is engaged, which as has been explained, affords overrun braking through the gearing 18 during coast.

*Low Range (Coast)*

In this range of operation, the throttle is closed, and hence, communication is established between the braking pressure feed line 176 and the braking valves supply line 178 between lands 154 and 156 on the detent valve 144. Since the setting of the manual valve 126 has not changed, the various lines are still connected, as in Low Range (Driving).

To best understand this aspect of the operation, assume first that vehicle speed at the time that the throttle was closed is above some predetermined speed, such as 40 m.p.h. Then, the first braking pressure regulator valve 322 will be closed since the governor pressure developed and existing in line 330 will hold the valve 322 in the depicted position interrupting flow from supply line 178. When vehicle speed decreases below 40 m.p.h., the first braking pressure regulator valve 322 will commence regulating and establish communication between the ports connected to the supply line 178 and the line 334 in the foregoing described manner. As vehicle speed decreases further, governor pressure in line 330 will fall while the regulated pressure in line 334 will increase at a proportional rate. This increasing pressure in line 334 is then transferred to the second braking pressure regulator valve 340 which is constructed to be open above some speed, e.g., 25 m.p.h. Therefore, lines 334 and 352 will be in communication and the pressure therein will be transferred to the shuttle valve 372. The shuttle valve 372, since the line 294 is open to exhaust, either through port 296 in the bore of the shift valve 272 or through the bore of the manual valve 126 dependent upon the position of the shift valve 272, will permit communication between lines 352 and 376, the latter extending to the friction device servo motor 46. The friction device 16 will be engaged with a progressively increasing pressure and with the reaction sun gear 34 restrained, as has been explained, the sun gear 36 on the driven side of the friction device 16 will be held also. The braking action, then, on the impeller 20 and accordingly the engine, will steadily increase as vehicle speed decreases to 25 m.p.h. Consequently, the increased engine resistance to rotation of the impeller 20 by the fluid circulated by the turbine 22, the driving member during coast, will augment the churn brake effect.

At the 25 m.p.h. speed mentioned, the first braking pressure regulator valve 322 becomes fully open and no longer regulates the pressure in the outlet line 334. At this time the second braking pressure regulator valve 340, because of the decreased governor pressure in line 350 thereto will start to close the port connected to line 334 and regulate the fluid pressure delivered by lines 352 and 376 to the friction device servo motor 46. The pressure of the fluid delivered now to the servo motor 46 decreases in proportion to decreasing governor pressure and vehicle speed, and therefore, the braking resistance from the friction device 16 will progressively decrease over this range of operation.

The friction device apply pressure is denoted "braking pressure" on the FIGURE 6 graph and as shown from approximately 40 m.p.h. to 25 m.p.h., the supply pressure increases, and thereafter, with the second braking pressure regulator valve 340 opperative decreases along with governor pressure. As a result, the friction device 16 offers maximum assistance at approximately 25 m.p.h.

The various control speeds, such as 40 m.p.h. and 25 m.p.h. were selected with a certain desirable amount of braking in mind. For example, and without limitation, with a 10% grade as a starting point, assume that a vehicle is descending this grade with the throttle closed above 40 m.p.h. Generally, engine resistance is sufficient to slow the vehicle to 40 m.p.h., but will not further retard it. Since this is a relatively fast speed for many hills, release of the accelerator pedal will bring into effect additional braking which increases along the curve until 25 m.p.h. is attained. Thereafter, this speed will be held, being considered a safe speed for descending most hills. At those speeds below 25 m.p.h., with the friction device 16 still effective, the assistance or the added resistance which tends to retard the engine must be decreased; for, otherwise, it is possible to stall the engine or cause it to run slower than needed to operate the front pump 56 at a minimum capacity for supplying the control system adequately.

In either range of braking, i.e., in the range between 25 and 40 m.p.h. and the range below 25 m.p.h., fluid pressure to the friction device servo motor 46 is also transferred by branch 378 to the converter valve element 244. This will cause the converter pressure to be altered in the foregoing described way so as to be along the curve on the FIGURE 6 graph denoted as "torque converter pressure."

Reverse

For Reverse Drive operation, the manual valve 126 is moved to the Reverse setting with the result that the land 134 interrupts communication between the main supply line 70 and the forward brake servo motor supply line 370. Line 370 will be exhausted out the open end of the manual valve bore as will the line 292 to the shift valve 272. Therefore, the forward brake 40 will be disengaged and the reducing line pressure influence on the face area of land 364 on the pressure regulator valve 60 will be removed and the shift valve 272 will be ineffective. The removal of reducing pressure on the pressure regulator valve 60 will cause the line pressure to increase to some selected amount for Reverse Drive operation only, thereby enabling the transmission reverse brake 52, with the increased apply pressure, to handle the customary greater reverse torque. Communication between the main supply line 70 and the reverse brake servo motor supply line 388 is established between the manual valve lands 132 and 134, while the lands 130 and 132 open the braking pressure feed line 176 and the branch 380 thereof to the exhaust port 392 in the bore of the manual valve 126. This causes the shuttle valve 382 to move to the exhausted line 380, hence connecting the supply line 388 with the low and reverse clutch supply line 384. Whereupon pressure fluid is supplied for engaging both the reverse brake 52 and the low and reverse clutch 48, it being necessary to engage the low and reverse clutch 48 for the reasons explained, namely, that in Reverse, the reaction sun gear 34 would attempt to rotate forwardly unless restrained by the clutch 48. The vehicle now is conditioned for backward movement.

Figure 7:
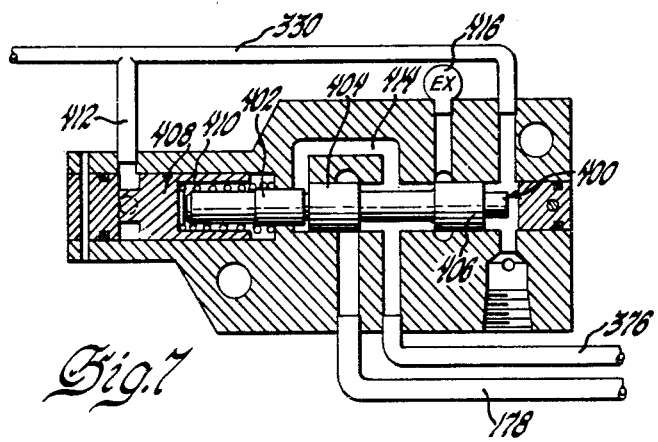
FIGURE 7 is a modified braking valve arrangement.

In FIGURE 7 a single braking valve 400 is illustrated which may be installed in the control system in place of the two braking valves 322 and 340. Braking valve 400 may be housed within a bore in the valve body and is formed with a small diameter land 402 and two somewhat larger equal diameter lands 404 and 406. Aligned with the valve 400 is a valve element 408 biased to the inoperative position by a spring 410. When installed in the control system, pressure fluid is supplied thereto through the supply line 178 from the detent valve 144. With the vehicle proceeding at a speed above 40 m.p.h., land 404 will block the port joined to the line 178 preventing further progress from this point. This is because governor pressure in branch 330 of the governor pressure supply line 192 is supplied both to the end area of the braking valve land 406 and through a branch 412 to the face area of the valve element 408. Because the latter area is greater, the braking valve 400 will be forced to the viewed position. As governor pressure decreases when vehicle speed commences to fall below 40 m.p.h. with the accelerator pedal released, the force exerted by the valve element 408 on the braking valve 400 will steadily decrease and the braking valve 400 will commence to regulate and deliver fluid pressure through a passage 414 to the differential area determined by the lands 402 and 404. The regulating movements will open and close the port joined to the line 178 and an exhaust port 416 so as to produce a regulated braking pressure in the friction device delivery line 376 that increases as vehicle speed decreases. Eventually, at 25 m.p.h., the spring 410 will move the valve element 408 out of engagement with the braking valve 400, whereupon only the governor pressure acting on the face area of the braking valve land 408 will be effective with the result that the regulated pressure in line 376 will now decrease with governor pressure. Both ranges of braking pressure will be the same as those obtained by the braking valves 322 and 340.

I claim:

1. A governor comprising, in combination, a centrifugal weight carried by a rotatable member, a stationary valve body provided with an inlet and an outlet and a series of separate bores, a pressure regulating valve mounted in one of the valve body bores and operative to deliver a variable pressure from the inlet to the outlet, the centrifugal weight being adapted to exert a biasing force on the regulating valve corresponding to the speed of the rotatable member so that the pressures developed thereby during one stage of operation have a predetermined relationship to the speed of the rotatable member, and pressure operated means including a valve element slidable in another of the valve body bores and exposed to the pressure in the outlet, and an interconnecting member for communicating movements of the valve element to the regulating valve, the valve element being adapted to become effective, when the pressure in the outlet exceeds a selected amount, to exert through the interconnecting member a counter force so as to oppose the force from the centrifugal weight and cause the regulating valve to develop pressures in another stage of operation having a different predetermined relationship to the speed of the rotatable member.

2. A governor comprising in combination, a centrifugal weight carried by a rotatable member, a stationary valve body provided with an inlet and an outlet, a pressure regulating valve mounted in the valve body and operative to deliver a variable pressure from the inlet to the outlet, the centrifugal weight being adapted to exert a biasing force on the regulating valve corresponding to the speed of the rotatable member so that the pressures developed thereby during one stage of operation have a predetermined relationship to the speed of the rotatable member, and pressure operated means including a valve element housed in the valve body and exposed to the pressure in the outlet, means for communicating movements of the valve element to the regulating valve, the valve element being adapted to become effective, when the pressure in the outlet exceeds a selected amount, to exert through the communicating means a counter force on the regulating valve so as to oppose the force from the centrifugal weight and cause the regulating valve to develop pressures in another stage of operation having a different predetermined relationship to the speed of the rotatable member, and biasing means for rendering the valve element ineffective until pressure in the outlet exceeds the selected amount.

3. A governor comprising, in combination, a centrifugal weight carried by a rotatable member, a stationary valve body provided with an inlet and an outlet, a pressure regulating valve mounted in the valve body and operative to deliver a variable pressure from the inlet to the outlet, the centrifugal weight being adapted to exert on the regulating valve a variable biasing force that as the speed of the rotatable member increases causes the pressures developed thereby during one stage of operation to have a predetermined relationship to the speed of the rotatable member, and pressure operated means including a valve element housed in the valve body and exposed to the pressure in the outlet, means for communicating movements of the valve element to the regulating valve, the valve element being adapted to become effective, when the pressure in the outlet exceeds a selected amount, to exert through the communicating means a counter force on the regulating valve so as to cause the regulating valve to develop pressures in another stage of operation having a different predetermined relationship to the speed of the rotatable member and a spring for rendering the valve element ineffective until pressure in the outlet exceeds the selected amount.

4. A governor comprising, in combination, a centrifugal weight carried by a rotatable member and adapted to move as the speed of the rotatable member increases, a stationary valve body provided with an inlet and an outlet, a pressure regulating valve mounted in the valve body and operative to deliver a variable pressure from the inlet to the outlet, a pivotally mounted lever arranged and constructed to transfer movements of the centrifugal weight to the regulating valve so as to exert a biasing force thereon that as the speed of the rotatable member increases the pressures developed thereby during one stage of operation have a predetermined relationship to the speed of the rotatable member, and pressure operated means including a valve element housed in the valve body and exposed to pressure in the outlet, means for communicating movements of the valve element to the regulating valve, the valve element being arranged to become effective, when the pressure in the outlet exceeds a selected amount, to exert through the communicating means a counter force on the regulating valve so as to cause the regulating valve to develop pressures in another stage of operation having a different predetermined relationship to the speed of the rotatable member, and a spring for rendering the valve element ineffective to transfer movements thereof through the communicating means to the regulating valve until pressure in the outlet exceeds the selected amount.

5. A governor comprising, in combination, a centrifugal weight carried by a rotatable member, a bearing member slidably positioned on the rotatable member adjacent the centrifugal weight, a stationary valve body provided with first and second bores, an inlet opening into the first bore and an outlet opening into both the first and second bores, a pressure regulating valve reciprocally mounted in the first bore and operative to deliver a variable pressure from the inlet to the outlet, a pivotally mounted lever having opposite ends thereof in engagement, respectively, with the bearing member, and the regulating valve and arranged, as the speed of the rotatable member increases, to exert a biasing force on the regulating valve in a pressure increasing direction so that the pressures developed thereby during one stage of operation have a predetermined relationship to the speed of the rotatable member, a valve element slidable in the second bore between operative and inoperative positions, a spring for urging the valve element to the inoperative position, an interconnecting member for transferring movements of the valve element to the operative position to the regulating valve so as to urge the regulating valve in a pressure decreasing direction, the valve element being adapted to become effective when the pressure from the outlet acting thereon exceeds a selected amount adequate to overcome the spring and move the valve element towards the operative position so as to cause the regulating valve to develop pressures in another stage of operation having a different predetermined relationship to the speed of the rotatable member.

6. A regulating valve mechanism comprising, in combination, a valve body provided with an inlet and an outlet, a regulating valve mounted in the valve body and operative to deliver a variable pressure from the inlet to the outlet, a valve element situated in the valve body adjacent the regulating valve, a source of control pressure, the control pressure acting on both the regulating valve and the valve element so as to tend to cause movements of the valve element to be transferred to the regulating valve, a spring functioning to prevent the valve element movements from being communicated to the regulating valve until the control pressure exceeds a selected amount, the regulating valve being operative when the control pressure is below the selected amount to develop one range of pressures that increase in proportion to increasing control pressure and when the control pressure exceeds the selected amount being operative to develop another range of pressures that decrease in inverse proportion to the increasing control pressure.

7. A regulating valve mechanism comprising, in combination, a valve body provided with an inlet and an outlet, a regulating valve mounted in the valve body and operative to deliver a variable pressure from the inlet to the outlet, biasing means for providing a variable force and arranged to cause the regulating valve to develop pressures corresponding to the variable force, and means eliminating the effect of the variable force from the biasing means tending to urge the regulating valve in one direction until the force exceeds a selected amount, the regulating valve being operative to develop one range of pressures having a predetermined proportion to the biasing means force when below the selected amount and another range of pressures having a different predetermined proportion to the biasing means force when above the selected amount.

8. A regulating valve mechanism comprising, in combination, a valve body provided with an inlet and an outlet, a regulating valve mounted in the valve body and operative to deliver a variable pressure from the inlet to the outlet, a source of control pressure, the control pressure acting to urge the regulating valve in opposite pressure varying directions, and biasing means eliminating the effect of the control pressure tending to urge the regulator valve in one direction until the control pressure exceeds a selected amount, the regulating valve being operative to develop one range of pressures having a predetermined proportion to the control pressure when below the selected amount and another range of pressures having a different predetermined proportion to the control pressure when above the selected amount.

9. A regulating valve mechanism comprising, in combination, a valve body provided with first and second bores, an inlet and an outlet opening into the first bore, a regulating valve slidably mounted in the first bore and operative to deliver a variable pressure from the inlet to the outlet, a valve element slidably positioned in the second bore, means for transferring movements of the valve element to the regulating valve, a source of control pressure, the control pressure acting on both the regulating valve and the valve element, a spring functioning to prevent the movement transferring means from communicating the movements of the valve element to the regulating valve until the control pressure exceeds a selected amount, the regulating valve being operative when the control pressure is below the selected amount to develop one range of pressures that increases proportionate to increasing control pressure and when the control pressure exceeds the selected amount being operative due to the influence of the valve element to develop another range of pressures that decreases in inverse proportion to the increasing control pressure.

10. A regulating valve mechanism comprising, in combination, a valve body provided with aligned first and second bores, an inlet and an outlet opening into the first bore, a regulating valve slidably mounted in the first bore and operative to deliver a variable pressure from the inlet to the outlet, a valve element slidable in the second bore and arranged to engage the regulating valve, a source of control pressure, the control pressure acting to urge the regulating valve and the valve element into engagement, a spring functioning to prevent the valve element from engaging the regulating valve until the control pressure exceeds a selected amount, the regulating valve being operative when the control pressure is below the selected amount to develop one range of pressures that increases in proportion to increasing control pressure and when the control pressure exceeds the selected amount being operative due to the influence of the valve element to develop another range of pressures that decreases in inverse proportion to the increasing control pressure.

11. A regulating valve mechanism comprising, in combination, a valve body provided with an inlet and an outlet, a regulating valve mounted in the valve body, a variable force source, the variable force being arranged to act on the regulating valve so as to cause the regulating valve to supply to the outlet a variable pressure corresponding to the variable force, a valve element arranged so as to alter the operation of the regulating valve, and means preventing the valve element from influencing the operation of the regulating valve until the variable force attains a certain value, the regulating valve being operative to develop one range of pressures having a predetermined proportion to the variable force when below the selected value and another range of pressures having a different predetermined proportion to the variable force when above the selected value and when the valve element becomes effective.

12. A regulating valve mechanism comprising, in combination, a valve body provided with an inlet and an outlet, a regulating valve mounted in the valve body, biasing means providing a variable force for acting on the regulating valve so as to cause the regulating valve to deliver from the inlet to the outlet a variable pressure corresponding to the variable force, and pressure operated means including a valve element exposed to the pressure in the outlet and operative when pressure in the outlet exceeds a selected amount to alter the operation of the regulating valve, the regulating valve being operative when the pressure in the outlet is below the selected amount to develop one range of pressures having one relationship to the variable force and when the pressure in the outlet is above the selected amount to develop due to the operation of the valve element another range of pressures having a different relationship to the variable force.

13. A governor comprising, in combination, a valve body provided with an inlet and an outlet, a pressure regulating valve mounted in the valve body, means applying a force to the regulating valve corresponding to the speed of a rotatable member so that the regulating valve will deliver a pressure to the outlet corresponding to the force, and pressure operated means including a valve element exposed to the pressure in the outlet and arranged when the pressure in the outlet exceeds a selected amount to change the operation of the regulating valve, the regulating valve being effective to develop one range of pressure when the pressure in the outlet is below the selected amount and a different range of pressures when the pressure is above the selected amount.

14. In a control system, means providing a variable force corresponding to the speed of a rotatable member, a valve body provided with an inlet connected to a fluid pressure source and an outlet, a pressure regulating valve mounted in the valve body, the regulating valve being arranged as to be acted on by the variable force so as to deliver to the outlet from the inlet variable pressures corresponding to the variable force, a valve element arranged to change the regulating action of the regulating valve when the variable force exceeds a selected value, the regulating valve being operative to develop one range of pressures having a predetermined proportion to the variable force when below the selected value and another range of pressures having a different predetermined proportion to the variable force when above the selected value and when the valve element becomes effective.

15. In a speed responsive control system, the combination of a source of speed responsive pressure, a valve body provided with an inlet connected to a source of pressure and an outlet, a pressure regulating valve mounted in the valve body and so arranged as to be acted on by the speed responsive pressure so as to deliver to the outlet regulated pressures corresponding to the speed responsive pressure, and pressure operated means including a valve element so arranged as to be exposed to the speed responsive pressure and operative when the speed responsive pressure exceeds a selected value to alter the operation of the regulating valve, the regulating valve being operative to develop one range of pressures having a predetermined proportion to the speed responsive pressure when below the selected value and another range of pressures having a different predetermined proportion to the speed responsive pressure when above the selected value and when the valve element becomes effective.

References Cited in the file of this patent

UNITED STATES PATENTS

| | | |
|---|---|---|
| 1,173,180 | Deffert | Feb. 29, 1916 |
| 1,793,514 | Schwendner | Feb. 24, 1931 |
| 2,385,201 | Gottlieb | Sept. 18, 1945 |
| 2,646,814 | Mueller | July 28, 1953 |
| 2,804,089 | Seifferle | Aug. 27, 1957 |
| 2,865,227 | Kelley | Dec. 23, 1958 |
| 2,911,987 | Wayman | Nov. 10, 1959 |